US012009135B2

(12) United States Patent
Ashizawa et al.

(10) Patent No.: US 12,009,135 B2
(45) Date of Patent: Jun. 11, 2024

(54) COIL DEVICE

(71) Applicant: TDK CORPORATION, Tokyo (JP)

(72) Inventors: Syun Ashizawa, Tokyo (JP); Takahiro Banzai, Tokyo (JP); Riku Umeki, Tokyo (JP); Satoshi Sugimoto, Tokyo (JP); Hitoshi Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 465 days.

(21) Appl. No.: 17/186,425

(22) Filed: Feb. 26, 2021

(65) Prior Publication Data

US 2021/0272736 A1 Sep. 2, 2021

(30) Foreign Application Priority Data

Feb. 27, 2020 (JP) ................................ 2020-032469

(51) Int. Cl.
*H01F 27/24* (2006.01)
*H01F 3/14* (2006.01)
*H01F 17/04* (2006.01)
*H01F 27/26* (2006.01)
*H01F 27/28* (2006.01)
*H01F 27/29* (2006.01)
*H01F 41/04* (2006.01)

(52) U.S. Cl.
CPC ............... *H01F 27/24* (2013.01); *H01F 3/14* (2013.01); *H01F 17/04* (2013.01); *H01F 27/263* (2013.01); *H01F 27/2852* (2013.01); *H01F 27/29* (2013.01); *H01F 41/04* (2013.01)

(58) Field of Classification Search
None
See application file for complete search history.

(56) References Cited

U.S. PATENT DOCUMENTS 11,676,756 B2 * 6/2023 Ji .............................. H01F 3/08 336/221
11,721,472 B2 * 8/2023 Zheng ..................... H01F 27/26 336/5
11,804,328 B2 * 10/2023 Xie ....................... H01F 27/324
2008/0303624 A1 12/2008 Yamada et al.
2015/0008008 A1 * 1/2015 Tanimizu .............. H01F 27/306 174/68.2
2019/0237245 A1 8/2019 Ashizawa et al.
2019/0378643 A1 * 12/2019 Zhou ................... H01F 27/2823
2022/0093315 A1 * 3/2022 Nam ......................... H01F 3/14
(Continued)

FOREIGN PATENT DOCUMENTS

JP H11-233348 A 8/1999
JP 2003-318036 A 11/2003
(Continued)

OTHER PUBLICATIONS

Abstract Translation of JP 2005-019716 A (Year: 2005).*
Machine Translation of JP 2004-235462 A (Year: 2004).*
Machine Translation of JP 2005019716 A (Year: 2005).*

*Primary Examiner* — Kevin M Bernatz
(74) *Attorney, Agent, or Firm* — Oliff PLC

(57) ABSTRACT

A coil device includes a main core and a sub core. The main core includes a middle leg for winding a coil body and an outer leg connected with the middle leg via a base portion. The sub core is disposed to face the base portion across the middle leg. A gap between the middle leg and the sub core is wider than that between the outer leg and the sub core.

9 Claims, 4 Drawing Sheets

(56) References Cited

U.S. PATENT DOCUMENTS

| | | | | |
|---|---|---|---|---|
| 2022/0130586 | A1* | 4/2022 | Kuo | H01F 37/00 |
| 2022/0200446 | A1* | 6/2022 | Tan | H01F 27/40 |
| 2023/0368959 | A1* | 11/2023 | Abe | H01F 27/2823 |

FOREIGN PATENT DOCUMENTS

| | | | | |
|---|---|---|---|---|
| JP | 2004-235462 | A | | 8/2004 |
| JP | 2005019716 | A | * | 1/2005 |
| JP | 2009-016797 | A | | 1/2009 |
| JP | 2014-116539 | A | | 6/2014 |
| JP | 2015-099818 | A | | 5/2015 |
| JP | 2019-073748 | A | | 5/2019 |
| JP | 2019-134147 | A | | 8/2019 |
| JP | 2019-216199 | A | | 12/2019 |

* cited by examiner

COIL DEVICE

BACKGROUND OF THE INVENTION

The present invention relates to a coil device used as, for example, an inductor.

A coil device used as an inductor is used for various electronic circuits, such as DC-DC converters. As such an inductor, for example, the inductor shown in Patent Document 1 is known.

In conventional inductors, a core made of ferrite material is normally used to improve the inductance. However, an inductor with a core made of ferrite material has a problem that characteristics, such as inductance, change easily by temperature change. In particular, there has recently been a demand for an inductor whose characteristics do not change very much even at a high temperature of about 100-170° C.

Then, an inductor with a core whose characteristics (e.g., inductance) do not change very much by temperature change, such as a core including a metal magnetic material, has been studied. However, there is a problem that an inductor with a core including a metal magnetic material or so normally has a small inductance.

Patent Document 1: JP2009016797 (A)

BRIEF SUMMARY OF INVENTION

The present invention has been achieved under such circumstances. It is an object of the invention to provide a coil device capable of obtaining a high inductance even if a core including a metal magnetic material is used.

To achieve the above object, a coil device according to the present invention comprises:

a main core including a middle leg for winding a coil body and an outer leg connected with the middle leg via a base portion; and a sub core disposed to face the base portion across the middle leg, wherein a gap between the middle leg and the sub core is wider than that between the outer leg and the sub core.

The present inventors have earnestly studied a coil device capable of obtaining a high inductance and consequently found that the inductance can be improved by making the gap between the middle leg and the sub core larger than that between the outer leg and the sub core. Then, the present invention has been accomplished. That is, the coil device according to the present invention can obtain a high inductance even if a core (main core or sub core) including a metal magnetic material is used.

Preferably, the main core includes a metal magnetic material (including amorphous alloy magnetic materials). Preferably, the sub core also includes a metal magnetic material. In the coil device with the core including a metal magnetic material, there is little change in characteristics for temperature change even in a high temperature environment of 100-170° C. or so.

The core including a metal magnetic material normally has a relative permeability of 15-100, which is lower than that of ferrite cores, but can obtain a desired high inductance by adjusting the gap between the middle leg and the sub core. Incidentally, a desired high inductance can be obtained by applying the structure of the present invention to a coil device including a core with a low relative permeability of about 15-100 even if this core is not a core including a metal magnetic material. In a core with a high relative permeability, however, the inductance of the entire core tends to be determined more greatly by characteristics of the material itself than making the gap between the middle leg and the sub core larger than that between the outer leg and the sub core.

Preferably, the gap between the middle leg and the sub core (center gap) has a width of 15-55 μm (more preferably, 20-50 μm). It is confirmed that the inductance is improved with such a predetermined center gap. The reason is not necessarily clear, but can be conceived as below.

That is, if the center gap is too small, the center gap may rather broaden due to an adhesive agent disposed in this gap, the sub core is likely to be inclined, and the gap between the outer leg and the sub core (side gap) may broaden. If the center gap is too large, it is conceivable that this configuration itself reduces the inductance of the entire core formed from the main core and the sub core. It is thereby conceivable that configuring a predetermined center gap makes it easy to bring the side gap to zero and improves the inductance of the entire core.

Preferably, the sub core is fixed to the main core with an adhesive agent disposed on a top surface of the middle leg. That is, the adhesive agent may exist in the center gap. Preferably, no adhesive agent exists between the outer leg and the sub core.

When the sub core is fixed to the main core only with the adhesive agent disposed on the top surface of the middle leg, that is, when the main core and the sub core are fixed only with the adhesive agent in a predetermined center gap, the sub core is hard to be inclined to the main core, the side gap can be close to zero, and the inductance of the entire core is easily improved. In addition, when the main core and the sub core are not fixed at the outer leg, even if a difference in thermal expansion due to temperature change is generated between the main core and the sub core, thermal stress is unlikely to act on the main core or sub core, the durability is improved, and characteristic change due to temperature change is unlikely to occur.

Preferably, the coil body is comprised of a plate conductor. In this structure, the DC resistance is low, large-capacity current can flow, and the coil device can also favorably be used as, for example, an inductor of a power supply system. Incidentally, the coil body may be formed from a conducting wire.

In the coil device according to the present invention, even if the coil body is wound around the middle leg by less than one turn, a desired high inductance can be obtained by adjusting the gap between the middle leg and the sub core. In addition, when the coil body is wound by less than one turn, the DC resistance is low, and a comparatively large allowable current can flow through the coil body.

A specific example of the coil body wound around the middle leg by less than one turn is not limited, but the following structure is exemplified.

That is, the coil body includes: a first body extending in a first axis on one side of the middle leg; a second body extending in the first axis on the other side of the middle leg; and a third body connecting the first body and the second body so as to surround the middle leg.

In the above-mentioned structure, the coil body can be wound around the middle leg by less than one turn.

Preferably, a first terminal is provided at one end of the first body in the first axis, a second terminal is provided at one end of the second body in the first axis, a first dummy terminal is provided at the other end of the first body in the first axis, and a second dummy terminal is provided at the other end of the second body in the first axis.

The first terminal and the second terminal can be used as input/output terminals of an inductor element, and if the terminals are connected with a mount board, the terminals can be connected with other electronic elements attached on the board. In addition, the mount strength of the coil device for the mount board is improved by connecting both of the dummy terminals with the mount board.

Preferably, the coil body is fixed to the main core or the sub core. If the coil body is fixed to both of the main core and the sub core, a deformation by thermal stress due to temperature change at high temperature may be generated between the coil body made of conductor and the main core or the sub core made of non-conductor, and the center gap or the side gap may change. If the coil body is fixed to only the main core or the sub core, however, thermal stress due to temperature change at high temperature is less generated, and the stability of characteristics for temperature change is enhanced.

Preferably, the middle leg is wider than the outer leg. Preferably, the middle leg is 1.5-2.5 times as wide as the outer leg. This configuration improves the flow of magnetic lines generated around the coil body and thereby improves characteristics of inductors or so.

DETAILED DESCRIPTION OF INVENTION

Hereinafter, the present invention is explained based on an embodiment shown in the figures.

Figure 1:
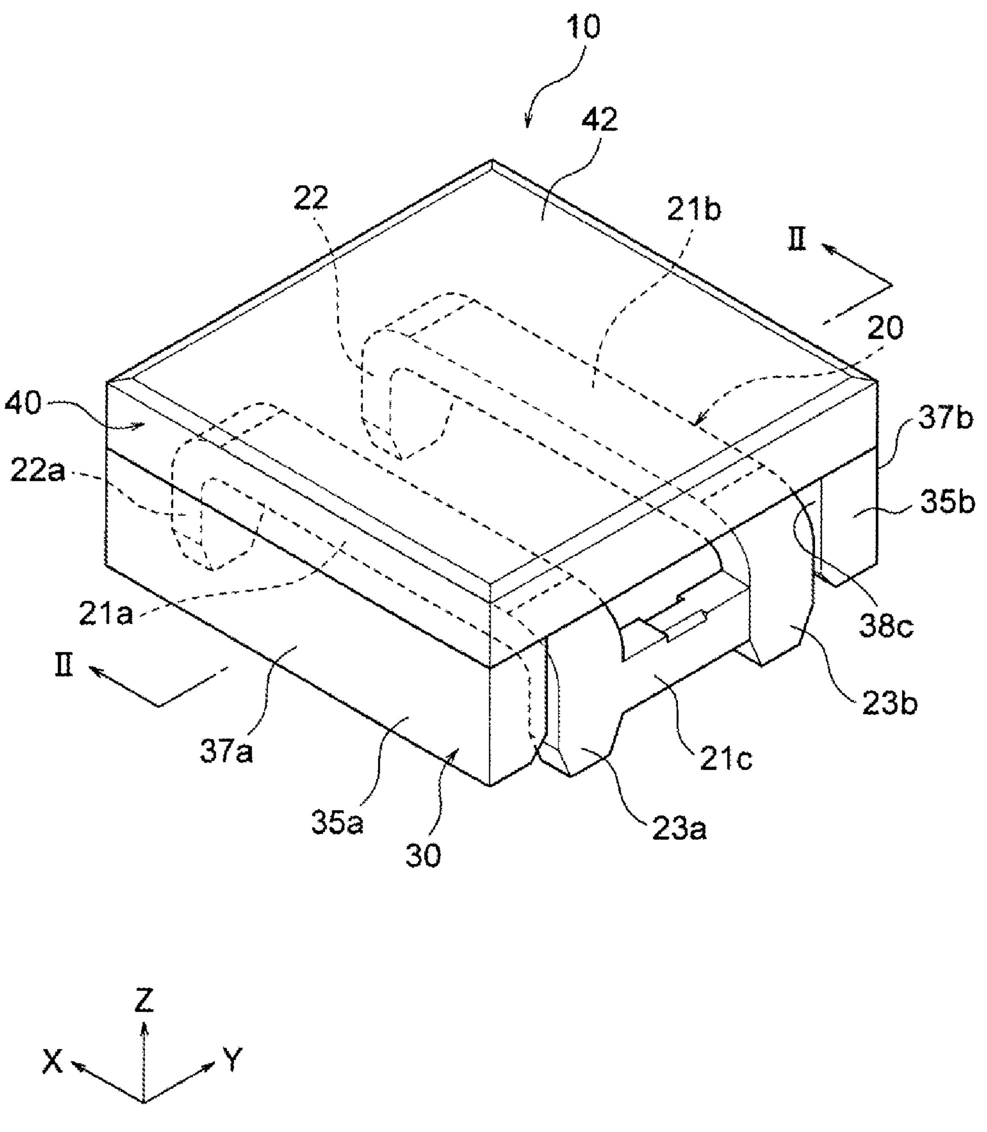
FIG. 1 is a schematic perspective view of a coil device according to an embodiment of the present invention.
Figure 2:
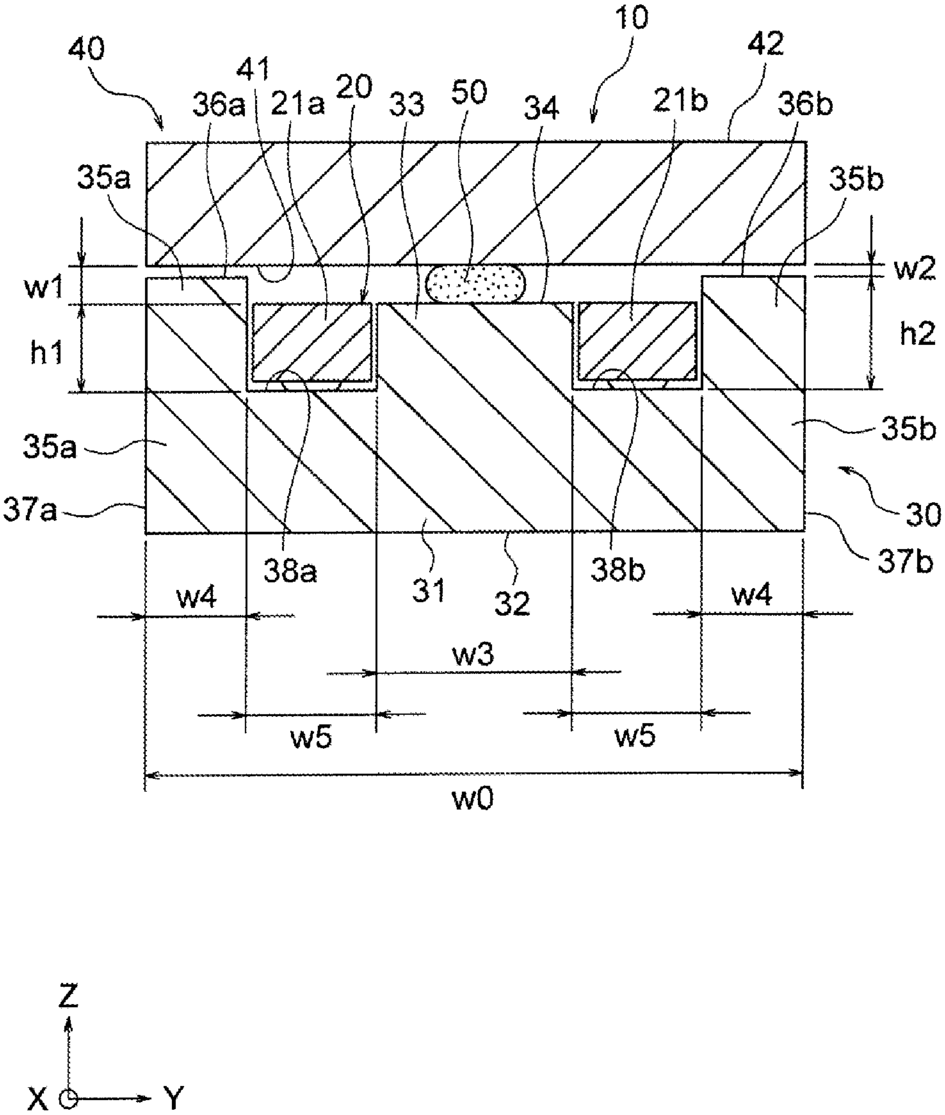
FIG. 2 is a cross-sectional view along the II-II line of the coil device shown in FIG. 1.
Figure 3:
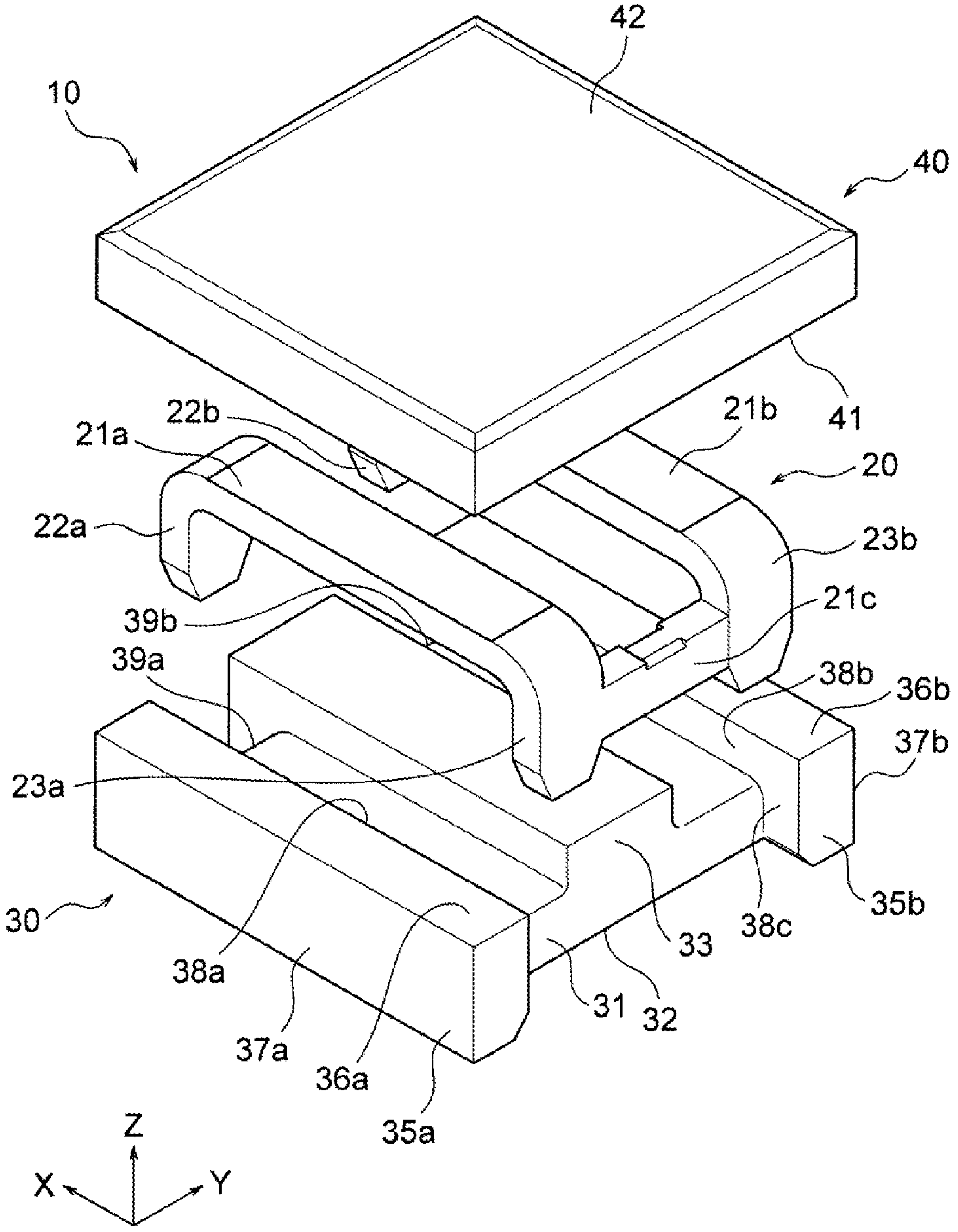
FIG. 3 is an exploded perspective view illustrating a relation among a main core, a sub core, and a coil body of the coil device shown in FIG. 1.

A coil device 10 according to an embodiment of the present invention shown in FIG. 1 to FIG. 3 is used as, for example, a power supply inductor. In the figures, the X-axis (first axis), the Y-axis (second axis), and the Z-axis (third axis) are perpendicular to each other. The coil device 10 includes a coil body 20, a main core 30, and a sub core 40. The coil body 20 is disposed on the upper side of the main core 30 in the Z-axis direction, and the sub core 40 is disposed on the upper side of the coil body 20 in the Z-axis direction.

In the present embodiment, as shown in FIG. 3, the coil body 20 includes a first body 21*a*, a second body 21*b*, and a third body 21*c*. The coil body 20 can be obtained by pressing a sheet of plate conductor, but may be formed by separately preparing the first body 21*a*, the second body 21*b*, and the third body 21*c* and connecting them.

The first body 21*a* and the second body 21*b* are away from each other in the Y-axis direction with a predetermined distance and extend substantially in parallel to each other in the X-axis direction. A first terminal 22*a* is formed at an end of the first body 21*a* on one side in the X-axis, and a second terminal 22*b* is formed at an end of the second body 21*b* on the same side in the X-axis. The first terminal 22*a* and the second terminal 22*b* are formed by being bent downward in the Z-axis from one ends of the first body 21*a* and the second body 21*b* on the same side.

A first dummy terminal 23*a* is formed at the other end of the first body 21*a* in the X-axis, and a second dummy terminal 23*b* is formed at the other end of the second body 21*b* in the X-axis. The first dummy terminal 23*a* and the second dummy terminal 23*b* are formed by being bent downward in the Z-axis from the other ends of the first body 21*a* and the second body 21*b* on the same side. The lower tips of the first terminal 22*a*, the second terminal 22*b*, the first dummy terminal 23*a*, and the second dummy terminal 23*b* in the Z-axis direction become narrower in taper manner.

In the present embodiment, the third body 21*c* is formed integrally with the first body 21*a* and the second body 21*b* in the Y-axis so as to connect between the first dummy terminal 23*a* of the first body 21*a* and the second dummy terminal 23*b* of the second body 21*b*. In the present embodiment, the first body 21*a*, the second body 21*b*, and the third body 21*c* are preferably formed with the same plate thickness, but may be formed with different plate thicknesses. Preferably, a Y-axis width w5 of the first body 21*a* shown in FIG. 2 is the same as a Y-axis width w5 of the second body 21*b*. Preferably, each of the widths w5 is the same as a Z-axis width of the third body 21*c* shown in FIG. 3.

The coil body 20 may be made of any conductor, such as copper, copper alloy, silver, and gold. Except for the tips of the terminals 22*a*, 22*b*, 23*a*, and 23*b*, an insulation film may be formed on the surface of the coil body 20. Preferably, conductor portions are exposed so as to electrically connect the tips of the terminals 22*a*, 22*b*, 23*a*, and 23*b* with, for example, a land pattern of a mount board. Since the main core 30 or the sub core 40 contacts with the land pattern except for the terminals 22*a*, 22*b*, 23*a*, and 23*b*, the main core 30 or the sub core 40 is preferably insulated from the land pattern if the surface of the main core 30 or the sub core 40 is a conductor. An insulation film may be formed on the surface of the core 30 or 40.

As shown in FIG. 3, the main core 30 includes a substantially rectangular flat plate base portion 31. A middle leg 33 protruding upward in the Z-axis is formed along the X-axis at a central part of the base portion 31 in the Y-axis. A first outer leg 35*a* protruding upward in the Z-axis is formed along the X-axis at one end of the base portion 31 in the Y-axis. In addition, a second outer leg 35*b* protruding upward in the Z-axis is formed along the X-axis at the other end of the base portion 31 in the Y-axis.

The middle leg 33 and the pair of outer legs 35*a* and 35*b* are parallel to each other along the X-axis on the upper side of the base portion 31. One end of the middle leg 33 in the X-axis direction protrudes from one end of the base portion 31 in the X-axis, and the other end of the middle leg 33 in the X-axis direction is located on the same plane as the other end of the base portion 31. In FIG. 3, one end in the X-axis direction is the back side in the X-axis direction, and the other end in the X-axis direction is the front side in the X-axis direction.

One ends of the pair of outer legs 35*a* and 35*b* protrude from the base portion 31 in the X-axis as much as the middle leg 33 does. Thus, a first terminal recess 39*a* is formed between the outer leg 35*a* and the middle leg 33, and a second terminal recess 39*b* is formed between the outer leg 35*b* and the middle leg 33, at one end of the base portion 31 in the X-axis direction.

The other ends of the pair of outer legs 35*a* and 35*b* protrude from the middle leg 33 in the X-axis direction. Thus, a third terminal recess 39*c* is formed between the outer leg 35*a* and the outer leg 35*b* at the other end of the base portion 31 in the X-axis direction. The bottom surfaces of the pair of outer legs 35*a* and 35*b* are formed to protrude downward in the Z-axis from a bottom surface 32 of the base portion 31, but the bottom surfaces of the pair of outer legs 35*a* and 35*b* and the bottom surface 32 of the base portion 31 may be formed on the same plane (flush) as shown in FIG. 2.

As shown in FIG. 3, a first terminal recess 38*a* extending in the X-axis direction is formed between the outer leg 35*a* and the middle leg 33 in the Y-axis, and a second terminal recess 38*b* extending in the X-axis direction is formed between the outer leg 35*b* and the middle leg 33 in the Y-axis, on the upper side of the base portion 31. The first terminal recess 38*a* is as wide as the first terminal recess 39*a* in the Y-axis direction and connects the first terminal recess 39*a* and a third recess 38*c*. The second terminal recess 38*b* is as wide as the second terminal recess 39*b* in the Y-axis direction and connects the second terminal recess 39*b* and a third recess 38*c*.

The first terminal 22*a* of the coil body 20 is configured to enter the first terminal recess 39*a*, and the second terminal 22*b* of the coil body 20 is configured to enter the second terminal recess 39*b*. The first body 21*a* of the coil body 20 is configured to enter the first terminal recess 38*a*, and the second body 21*b* of the coil body 20 is configured to enter the second terminal recess 38*b*.

Moreover, the first dummy terminal 23*a*, the second dummy terminal 23*b*, and the third body 21*c* is configured to integrally enter the third recess 38*c*. Thus, the terminals 22*a*, 22*b*, 23*a*, and 23*b* of the coil body 20 do not protrude in the X-axis direction from both ends of the main core 30 in the X-axis direction. This is also the case with the third body 21*c*.

However, the terminals 22*a*, 22*b*, 23*a*, and 23*b* and the third body 21*c* of the coil body 20 may slightly protrude in the X-axis direction from both ends of the main core 30 in the X-axis direction. This is for easy confirmation of a solder fillet that may be attached to the outer surfaces of the terminals 22*a*, 22*b*, 23*a*, and 23*b* of the coil body 20 in the X-axis direction.

Incidentally, the main core 30 may not include the first terminal recess 39*a*, the second terminal recess 39*b*, or the third recess 38*c*. In that case, the terminals 22*a*, 22*b*, 23*a*, and 23*b* and the third body 21*c* of the coil body 20 protrude in the X-axis direction from both ends of the main core 30 in the X-axis direction by the thickness of the coil body 20 or more.

The lower tips of the first terminal 22*a*, the second terminal 22*b*, the first dummy terminal 23*a*, and the second dummy terminal 23*b* in the Z-axis direction protrude downward from the base bottom surface 32 and the bottom surfaces of the outer legs 35*a* and 35*b*. This is because the lower tips are electrically connected with, for example, a land pattern of a mount board.

In the present embodiment, the first body 21*a*, the second body 21*b*, and the third body 21*c* of the coil body 20 surround three directions of the middle leg 33 of the main core 30 and constitute a coil wound by one turn or less.

As shown in FIG. 2, the sub core 40 is disposed above the main core 30 in the Z-axis direction. The sub core 40 includes an inner surface 41 and an outer surface and has a rectangular plate shape as a whole. The width of the sub core 40 in each of the X-axis direction and the Y-axis direction is preferably equal to that of the main core 30, but may slightly be different from that of the main core 30.

In the present embodiment, as shown in FIG. 1, each side of the sub core 40 in the X-axis direction is substantially as long as a side surface 37*a* of the first outer leg 35*a* and a side surface 37*b* of the second outer leg 35*b* in the X-axis direction, and each side of the sub core 40 in the Y-axis direction is substantially as long as the distance between the side surface 37*a* of the first outer leg 35*a* and the side surface 37*b* of the second outer leg 35*b*.

An outer surface 42 of the sub core 40 is a flat surface. The outer periphery of the outer surface 42 may be chamfered. The outer surface 42 is a substantially plane surface. A vacuum suction head or so can detachably be attached onto the outer surface 42 and transport the coil device 10.

An inner surface 41 of the sub core 40 is also a flat surface. The sub core 40 is disposed and fixed on the upper side of the main core 30 in the Z-axis direction so that a top surface 34 of the middle leg 33 and top surfaces 36*a* and 36*b* of the outer legs 35*a* and 35*b* face the inner surface 41. In the present embodiment, an adhesive agent 50 exists only between the top surface 34 of the middle leg 33 and the inner surface 41 of the sub core 40, and the adhesive agent 50 does not exist between the top surfaces 36*a* and 36*b* of the outer legs 35*a* and 35*b* and the inner surface 41 of the sub core 40. That is, in the present embodiment, the main core 30 and the sub core 40 are fixed only by the adhesive agent 50 on the middle leg 33.

As shown in FIG. 2, a width w3 of the middle leg 33 in the Y-axis is larger than a width w4 of the outer leg 35*a* (35*b*) and is preferably configured to be 1.5-2.5 times as large as a width w4 of the outer leg 35*a* (35*b*). Incidentally, a width w4 of the first outer leg 35*a* and a width w4 of the second outer leg 35*b* may not necessarily be the same, but are preferably substantially equal to each other. Each width w5 of the first recess 38*a* and the second recess 38*b* in the Y-axis direction is determined so that the body 21*a* (21*b*) enters the recess 38*a* (38*b*) and is slightly larger than a width of the body 21*a* (21*b*) in the Y-axis direction.

Preferably, a width w5 of the recess 38*a* (38*b*) in the Y-axis is equal to or larger than a width w4 of the outer leg 35*a* (35*b*) and is smaller than a width w3 of the middle leg 33. The width w3 of the middle leg 33 is about ⅙-½ of an entire width w0 of the main core 30 in the Y-axis.

In the present embodiment, a height h1 from the bottom surface of the recess 38*a* (38*b*) to the top surface 34 of the middle leg 33 is smaller than a height h2 from the bottom surface of the recess 38*a* (38*b*) to a top surface of the outer leg 35*a* (35*b*). The difference (h2−h1) between the height h2 and the height h1 is preferably 15-55 μm, more preferably 20-50 μm.

In the present embodiment, preferably, a center gap w1 is larger than a side gap w2, where w1 is a gap between the top surface 34 of the middle leg 33 and the inner surface 41 of the sub core 40, and w2 is a gap between the top surface 36*a* (36*b*) of the outer leg 35*a* (35*b*) and the inner surface 41 of the sub core 40. In addition, the top surface 36*a* (36*b*) of the outer leg 35*a* (35*b*) and the inner surface 41 of the sub core 40 are preferably contacted with each other, and the side gap w2 is preferably substantially zero. Preferably, the adhesive agent 50 is as thick as a center gap w1.

The thickness of the body 21*a* (21*b*) in the Z-axis accommodated in the recess 38*a* (38*b*) is preferably as large as the height h1 of the middle leg 33, but may be smaller or larger than the height h1 of the middle leg 33. The larger the thickness of the body 21*a* (21*b*) in the Z-axis is, the smaller the DC resistance of the coil body 20 can be. In the present embodiment, preferably, the thickness of the body 21*a* (21*b*) in the Z-axis is smaller than the height h2 of the outer leg 35*a* (35*b*). When the inner surface 41 of the sub core 40 is not a flat surface and includes a recess at a position corresponding to the recess 38*a* (38*b*), the thickness of the body 21*a* (21*b*) in the Z-axis can be larger than the height h2 of the outer leg 35*a* (35*b*).

In the present embodiment, the first body 21*a* is fixed on the bottom surface of the first recess 38*a* with adhesive agent, and the second body 21*b* is similarly fixed on the bottom surface of the second recess 38*b* with adhesive agent. Then, the body 21*a* (21*b*) is not fixed to the inner surface 41 of the sub core 40 by adhesion or so. In other embodiments, the first body 21*a* may not be fixed on the bottom surface of the first recess 38*a* by adhesive agent, and the second body 21*b* may not similarly be fixed on the bottom surface of the second recess 38*b* by adhesive agent. Instead, the body 21*a* (21*b*) may be fixed to the inner surface 41 of the sub core 40 by adhesive agent or so.

In the present embodiment, the main core 30 is made of a metal magnetic material (including amorphous alloy magnetic material) and a composite magnetic material containing a resin. Instead, the main core 30 may be a sintered body of a metal magnetic material. Likewise, the sub core 40 is also made of a metal magnetic material and a composite magnetic material containing a resin. Instead, the sub core 40 may be a sintered body of a metal magnetic material. The main core 30 and the sub core 40 have a relative permeability of, for example, 15-100. The metal magnetic material is, for example, a Co based amorphous alloy.

Incidentally, the main core 30 and the sub core 40 may be made of different types of magnetic materials. The sub core 40 may be made of a nonmagnetic material, such as resin and ceramic.

The present inventors have found that the coil device 10 according to the present embodiment can obtain a high inductance even if the main core 30 and the sub core 40 containing a metal magnetic material are used. Moreover, in the present embodiment, since the coil device 10 includes the cores 30 and 40 containing a metal magnetic material, there is little change in characteristics for temperature change even in a high temperature environment of 100-170° C. or so.

Incidentally, the cores 30 and 40 containing a metal magnetic material normally have a relative permeability of 15-100, which is lower than that of ferrite cores, but can obtain a desired high inductance by adjusting the gap w1 between the middle leg 33 and the sub core 40. Incidentally, a desired high inductance can be obtained by applying the structure of the present embodiment to a coil device including a core with a low relative permeability of about 15-100 even if this core is not a core including a metal magnetic material.

In the present embodiment, the center gap w1 between the middle leg 33 and the sub core 40 is preferably 15-55 μm, more preferably 20-50 μm. It is confirmed that the inductance is improved with such a predetermined center gap w1. The reason is not necessarily clear, but can be conceived as below.

That is, if the center gap w1 is too small in the structure as shown in FIG. 2, the center gap w1 may rather broaden due to the thickness of the adhesive agent 50 disposed in this gap. It is also conceivable that the sub core 40 is likely to be inclined horizontally in FIG. 2, which may broaden either of the gaps (side gaps) between the outer leg 35*a* (35*b*) and the inner surface 41 of the sub core 40. If the center gap w1 is too large, it is conceivable that this configuration itself reduces the inductance of the entire core formed from the main core 30 and the sub core 40. It is thereby conceivable that configuring a predetermined center gap w1 makes it easy to bring the side gaps to zero and improves the inductance of the entire core.

In the present embodiment, the sub core 40 is fixed to the main core 30 with the adhesive agent 50 disposed on the top surface 34 of the middle leg 33. No adhesive agent exists between the outer leg 35*a* (35*b*) and the sub core 40.

Since the sub core 40 is fixed to the main core 30 only with the adhesive agent 50 disposed on the top surface 34 of the middle leg 33, the sub core 40 is hard to be inclined to the main core 30, the side gaps w2 on both sides can be close to zero, and the inductance of the entire core is easily improved. In addition, since the main core 30 and the sub core 40 are not fixed at the outer leg 35*a* (35*b*), even if a difference in thermal expansion due to temperature change is generated between the main core 30 and the sub core 40, thermal stress is unlikely to act on the main core 30 or sub core 40, the durability is improved, and characteristic change due to temperature change is unlikely to occur.

In the present embodiment, the coil body 20 is made of a plate conductor. In this structure, the DC resistance is low, large-capacity current can flow, and the coil device can also favorably be used as, for example, an inductor of a power supply system.

In the coil device 10 according to the present embodiment, even if the coil body 20 is wound around the middle leg 33 by less than one turn, a desired high inductance can be obtained by adjusting the gap w1 between the middle leg 33 and the sub core 40. In addition, since the coil body 20 is wound by less than one turn, the DC resistance is low, and a comparatively large allowable current can flow through the coil body 20.

In the present embodiment, the first terminal 22*a* and the second terminal 22*b* shown in FIG. 3 can be used as input/output terminals of an inductor element, and if the terminals are connected with a mount board not illustrated, the terminals can be connected with other electronic elements attached on the board. In addition, the mount strength of the coil device 10 for the mount board is improved by connecting both of the dummy terminals 23*a* and 23*b* with the mount board.

In the present embodiment, the coil body 20 is fixed to only the main core 30 or the sub core 40. If the coil body 20 is fixed to both of the main core 30 and the sub core 40, a deformation by thermal stress due to temperature change at high temperature may be generated between the coil body 20 made of conductor and the main core 30 or the sub core 40 made of non-conductor, and the center gap or the side gaps may change. If the coil body 20 is fixed to only the main core 30 or the sub core 40, however, the coil device 10 is less affected by a stress by difference in thermal expansion due to temperature change at high temperature, and the stability of characteristics for temperature change is enhanced.

In the present embodiment, the width w3 of the middle leg 33 is larger than the width w4 of the outer leg 35*a* (35*b*) and is preferably 1.5-2.5 times as large as the width w4 of the outer leg 35*a* (35*b*). This configuration improves the flow of magnetic lines generated around the coil body 20 and thereby improves characteristics of inductors or so.

Incidentally, the present invention is not limited to the above-mentioned embodiment and can variously be modified within the scope of the present invention.

In the above-mentioned embodiment, the X-axis, the Y-axis, and the Z-axis are explained as axes perpendicular to each other, but it is sufficient that the axes have an angle of about 90 degrees, and the axes can have an angle other than 90 degrees as long as similar effects are demonstrated.

In the above-mentioned embodiment, the third body 21*c* is connected with the first body 21*a* and the second body 21*b* via the first dummy terminal 23*a* and the second dummy terminal 23*b*, but may directly be connected with the first body 21*a* and the second body 21*b*.

In the above-mentioned embodiment, the top surface 34, the top surface 36*a*, and the top surface 36*b* are flat surfaces, but all of these top surfaces may be curved surfaces or step surfaces.

In the above-mentioned embodiment, the sub core 40 is a so-called I-core, but may be a so-called C-core with outer legs arranged to face the outer legs 35*a* and 35*b* of the main core 30. Instead, like the main core 30, the sub core 40 may be a so-called E-core with the middle leg 33 and the outer legs 35*a* and 35*b*. That is, the middle leg and the outer legs of the sub core may be arranged to face the middle leg and the outer legs of the main core.

Moreover, the main core 30 and the sub core 40 may be one core combined at both of the top surface 36*a* and the top surface 36*b*. In this case, the coil device 10 can be manufactured even without the adhesive agent 50.

In the above-mentioned embodiment, the main core 30 is made of a metal magnetic material with a small temperature change for use in high temperature environment (100-170° C.), but may be a ferrite core.

In other embodiments, two or more middle legs of the main core 30 may be arranged in parallel in the Y-axis direction. In this case, a recess is further formed between the middle legs. Even in such an embodiment, the coil body can be formed with one plate conductor and includes a terminal for energization at an end of the coil body.

The coil body 20 may not be a plate conductor and may be a conducting wire.

EXAMPLES

Hereinafter, the present invention is explained based on further detailed examples, but is not limited to the examples.

Example 1

Samples of the coil device 10 shown in FIG. 1 to FIG. 3 were manufactured. The samples of the coil device 10 were measured in terms of inductance with the following conditions.

Figure 4:
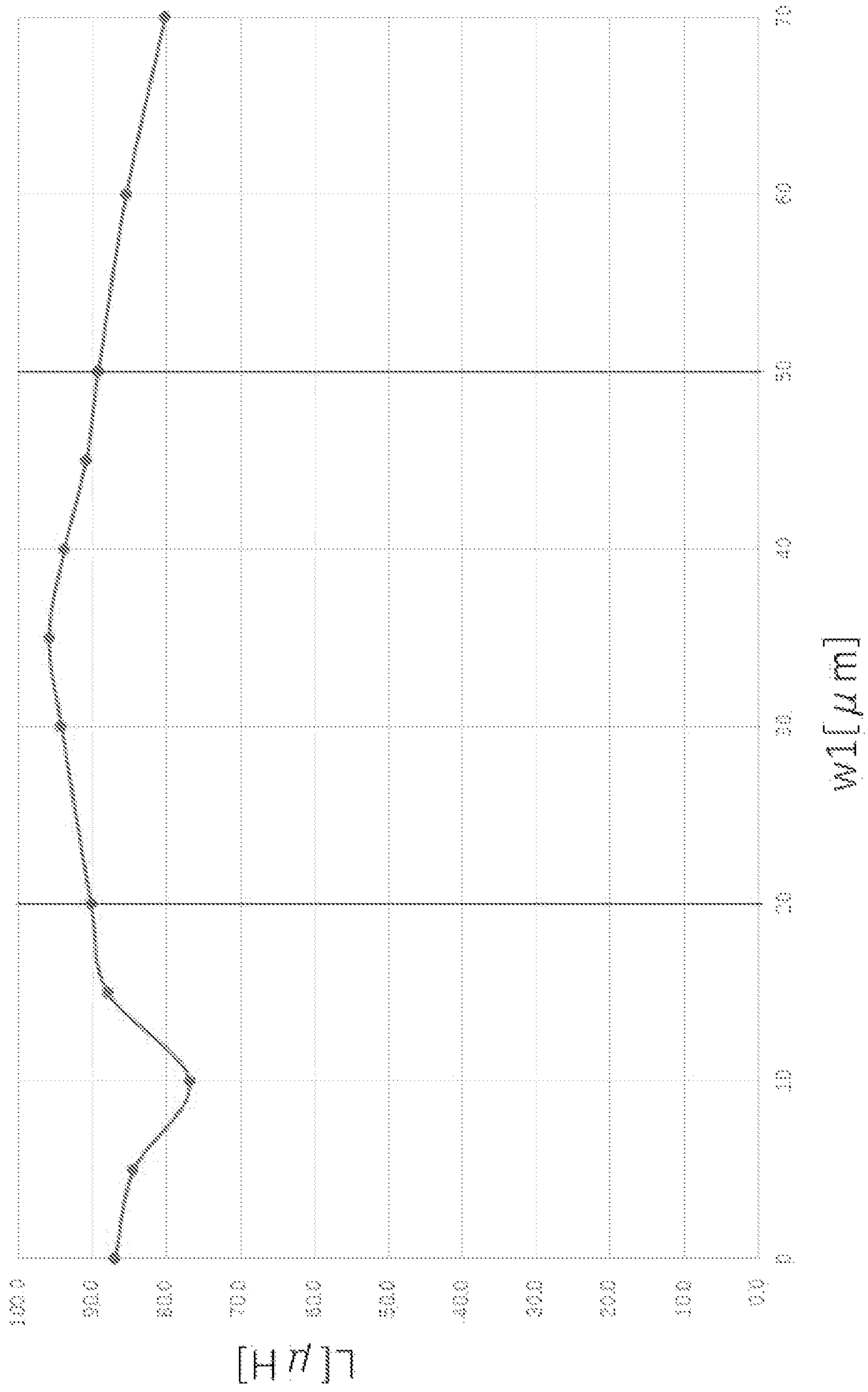
FIG. 4 is a graph illustrating a relation between an inductance and a center gap of the coil device according to the present example.

A center gap w1 of the coil device 10 according to the present embodiment was changed as shown in the horizontal axis of FIG. 4, and an inductance L of each sample of the coil device 10 was measured with an impedance analyzer. The results are shown in FIG. 4.

As shown in FIG. 4, it turned out that the inductance decreased if the center gap w1 became slightly larger than zero, but started to increase after about 10 μm. Then, it turned out that the inductance after the center gap w1 was 15 μm to 20 μm was higher than that when the center gap w1 was zero. It turned out that the inductance to be obtained increased as the center gap w1 further increased and became lower than that when the center gap w1 was zero after the center gap w1 exceeded 55 μm.

DESCRIPTION OF THE REFERENCE NUMERICAL

10 . . . coil device
20 . . . coil body
21*a* . . . first body
21*b* . . . second body
21*c* . . . third body
22*a* . . . first terminal
22*b* . . . second terminal
23*a* . . . first dummy terminal
23*b* . . . second dummy terminal
30 . . . main core
31 . . . base portion
32 . . . base bottom surface
33 . . . middle leg
34, 36*a*, 36*b* . . . top surface
35*a* . . . first outer leg
35*b* . . . second outer leg
37*a*, 37*b* . . . side surface
38*a* . . . first recess
38*b* . . . second recess
38*c* . . . third recess
39*a* . . . first terminal recess
39*b* . . . second terminal recess
40 . . . sub core
41 . . . inner surface
42 . . . outer surface
50 . . . adhesive agent

What is claimed is:

1. A coil device comprising:
a main core including a middle leg for winding a coil body and an outer leg connected with the middle leg via a base portion; and
a sub core disposed to face the base portion across the middle leg,
wherein the main core has a relative permeability of 15-100,
a gap between the middle leg and the sub core is wider than that between the outer leg and the sub core,
the sub core is fixed to the main core with an adhesive agent disposed on a top surface of the middle leg,
no adhesive agent exists between the outer leg and the sub core,
the gap between the middle leg and the sub core has a width of 15 to 55 μm, wherein the gap between the middle leg and the sub core is located around the adhesive agent,
the coil body is made of a plate conductor and wound around the middle leg by less than one turn, and
a height from a bottom surface of a recess, formed on the main core for accommodating the coil body, to the top surface of the middle leg is smaller than a height from the bottom surface of the recess to a top surface of the outer leg.

2. The coil device according to claim 1, wherein the main core includes a metal magnetic material.

3. The coil device according to claim 1, wherein the sub core has a relative permeability of 15-100.

4. The coil device according to claim 1, wherein the coil body includes:
a first body extending in a first axis on one side of the middle leg;
a second body extending in the first axis on the other side of the middle leg; and
a third body connecting the first body and the second body so as to surround the middle leg.

5. The coil device according to claim 4, wherein
a first terminal is provided at one end of the first body in the first axis,
a second terminal is provided at one end of the second body in the first axis,
a first dummy terminal is provided at the other end of the first body in the first axis, and
a second dummy terminal is provided at the other end of the second body in the first axis.

6. The coil device according to claim 1, wherein the coil body is fixed to the main core or the sub core.

7. The coil device according to claim 1, wherein the middle leg is wider than the outer leg.

8. The coil device according to claim 7, wherein the middle leg is 1.5-2.5 times as wide as the outer leg.

9. The coil device according to claim 1, wherein the gap between the middle leg and the sub core is an air gap.

* * * * *